(12) United States Patent
Momma et al.

(10) Patent No.: US 10,627,836 B2
(45) Date of Patent: Apr. 21, 2020

(54) PUMPING APPARATUS AND SUBSTRATE TREATING APPARATUS

(71) Applicant: SCREEN Holdings Co., Ltd., Kyoto (JP)

(72) Inventors: Toru Momma, Kyoto (JP); Hiroyuki Ogura, Kyoto (JP); Masahito Kashiyama, Kyoto (JP); Satoshi Yamamoto, Kyoto (JP); Hiroyuki Takeuchi, Kyoto (JP); Shoji Kirita, Kyoto (JP); Junki Nishimura, Kyoto (JP); Shogo Yoshida, Kyoto (JP)

(73) Assignee: SCREEN Holdings Co., Ltd. (JP)

(*) Notice: Subject to any disclaimer, the term of this patent is extended or adjusted under 35 U.S.C. 154(b) by 36 days.

(21) Appl. No.: 16/048,442

(22) Filed: Jul. 30, 2018

(65) Prior Publication Data

US 2019/0064853 A1 Feb. 28, 2019

(30) Foreign Application Priority Data

Aug. 25, 2017 (JP) ................................. 2017-162273

(51) Int. Cl.
| | | |
|---|---|---|
| G05D 7/06 | (2006.01) | |
| B05C 11/10 | (2006.01) | |
| F04B 43/04 | (2006.01) | |
| F04B 13/00 | (2006.01) | |
| F04B 43/02 | (2006.01) | |

(Continued)

(52) U.S. Cl.
CPC .......... *G05D 7/0617* (2013.01); *B05C 11/101* (2013.01); *F04B 13/00* (2013.01); *F04B 43/02* (2013.01); *F04B 43/04* (2013.01); *F04B 49/065* (2013.01); *F04B 49/20* (2013.01); *G05D 7/0623* (2013.01); *F04B 2201/0201* (2013.01); *F04B 2205/09* (2013.01)

(58) Field of Classification Search
None
See application file for complete search history.

(56) References Cited

U.S. PATENT DOCUMENTS

2005/0048196 A1* 3/2005 Yanagita ............... B05B 12/085
427/8
2005/0241576 A1* 11/2005 Gaon .................... B05B 12/084
118/665

(Continued)

FOREIGN PATENT DOCUMENTS

| CN | 105696009 A | 6/2016 |
|---|---|---|
| JP | 2006-060251 A | 3/2006 |

(Continued)

OTHER PUBLICATIONS

Office Action dated Jul. 31, 2019 for Taiwan Patent Application No. 107126309.

*Primary Examiner* — Ryan A Jarrett
(74) *Attorney, Agent, or Firm* — Ostrolenk Faber LLP

(57) ABSTRACT

A pumping apparatus includes a pump chamber, a piston, a motor, and a controller. The controller determines an imaginary terminal point by referring to a dispense command, theoretical information, and a current position of the piston. The controller corrects the imaginary terminal point to a target position by referring to a correction graph. The controller outputs a drive command to the motor for moving the piston from a start position to the target position.

15 Claims, 5 Drawing Sheets

(51) Int. Cl.
*F04B 49/20* (2006.01)
*F04B 49/06* (2006.01)

(56) References Cited

U.S. PATENT DOCUMENTS

| | | | |
|---|---|---|---|
| 2006/0263513 A1* | 11/2006 | Romanin | C03C 17/002 427/8 |
| 2010/0230834 A1 | 9/2010 | Sakata et al. | 261/152 |
| 2011/0042478 A1 | 2/2011 | Ikushima | 239/11 |
| 2015/0336029 A1 | 11/2015 | Kobayashi et al. | |

FOREIGN PATENT DOCUMENTS

| | | |
|---|---|---|
| KR | 10-2006-0121393 A | 11/2006 |
| KR | 10-2010-0124763 A | 11/2010 |
| KR | 10-2010-0125133 A | 11/2010 |
| TW | 201040306 A1 | 11/2010 |

* cited by examiner

| PAIR NO. | THEORECAL POSITION [pls] | ACTUAL POSITION [pls] | DISPENSED AMOUNT [cc] |
|---|---|---|---|
| 0 | 0 | 0 | 0.00 |
| 1 | 50 | 25 | 0.50 |
| 2 | 100 | 50 | 1.00 |
| 3 | 200 | 120 | 2.00 |
| 4 | 275 | 200 | 2.75 |
| 5 | 300 | 300 | 3.00 |
| 6 | 400 | 450 | 4.00 |

FIG. 5
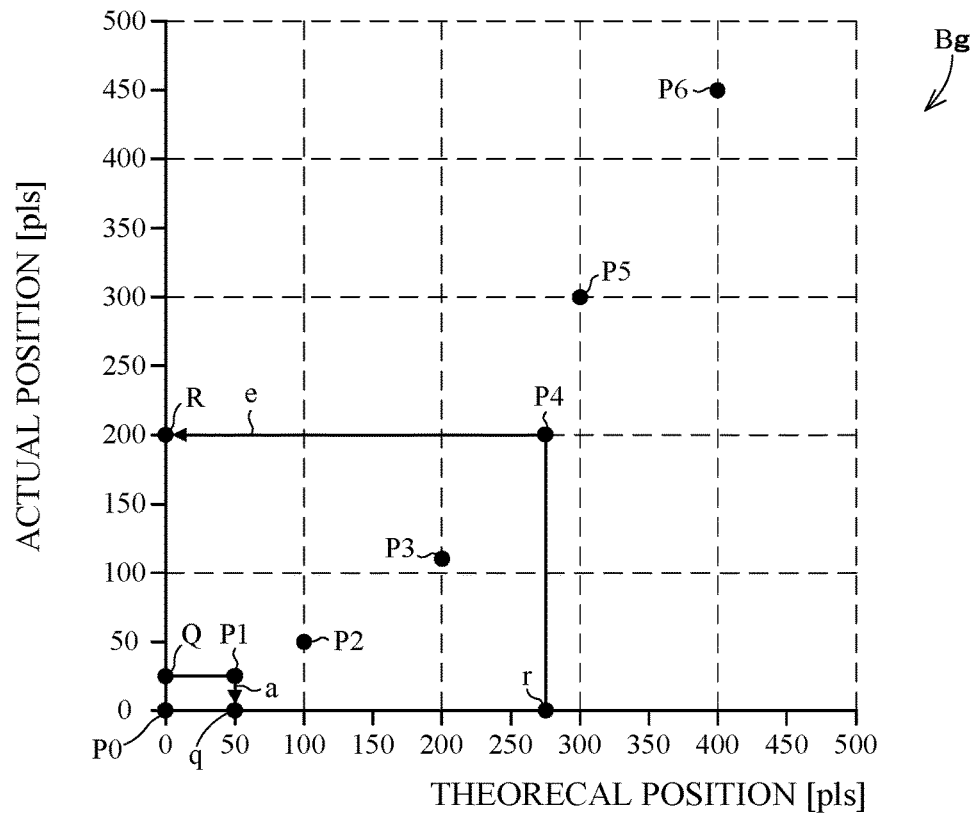
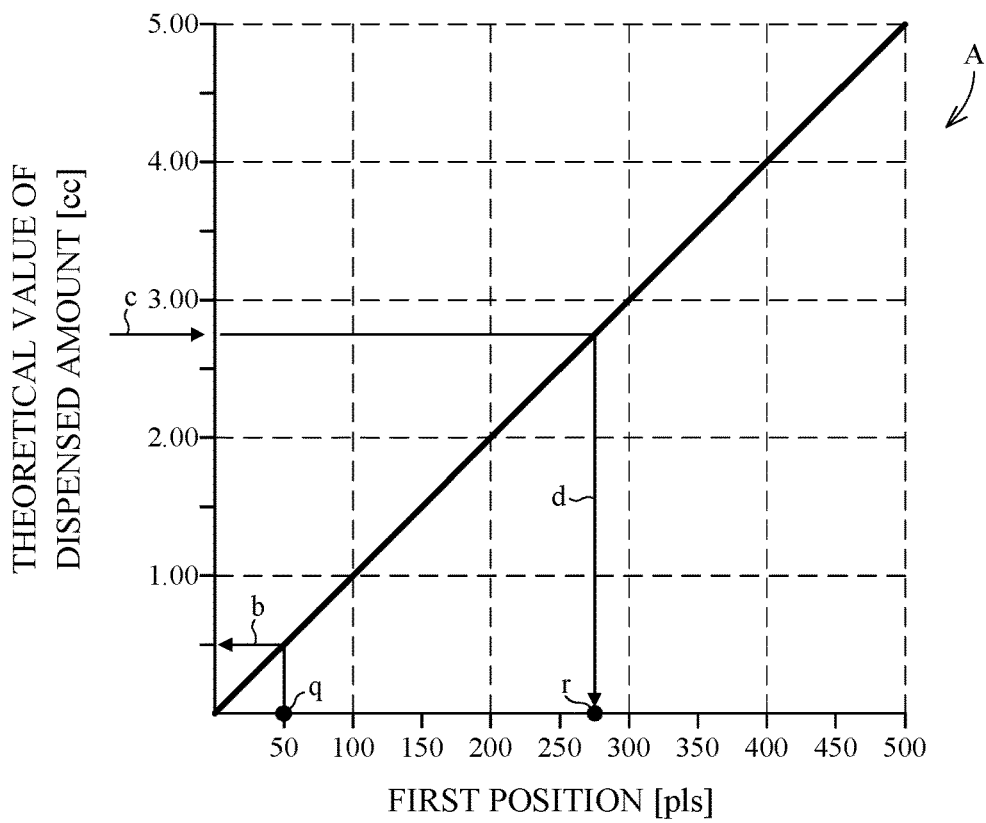

| PAIR NO. | THEORECAL POSITION [pls] | ACTUAL POSITION [pls] | DISPENSED AMOUNT [cc] |
|---|---|---|---|
| 0 | 25 | 25 | 0.00 |
| 1 | 75 | 50 | 0.50 |
| 2 | 175 | 120 | 1.50 |
| 3 | 250 | 200 | 2.25 |
| 4 | 275 | 300 | 2.50 |
| 5 | 375 | 450 | 3.50 |

PUMPING APPARATUS AND SUBSTRATE TREATING APPARATUS

CROSS-REFERENCE TO RELATED APPLICATIONS

This application claims priority to Japanese Patent Application No. 2017-162273 filed Aug. 25, 2017, the disclosure of which is hereby incorporated herein by reference in its entirety for all purposes.

BACKGROUND OF THE INVENTION

Field of the Invention

This invention relates to a pumping apparatus for dispensing a liquid, and a substrate treating apparatus for treating substrates. The substrates include, for example, semiconductor wafers, substrates for liquid crystal displays, substrates for organic EL (Electroluminescence) displays, substrates for FPDs (Flat Panel Displays), substrates for optical displays, substrates for magnetic disks, substrates for magneto-optical disks, substrates for photomasks, and substrates for solar cells.

Description of the Related Art

Japanese Unexamined Patent Publication No. 2006-60251 discloses a substrate treating apparatus having a motor, a pump, a controller, and a display. The motor drives the pump. The motor is a pulse motor. The pump dispenses a resist solution. The operator inputs control information for the pump to the controller. The control information includes dispensing time and dispensing speed, for example. The controller controls the motor based on the control information. The controller controls the motor with a drive pulse. The controller calculates a dispensed amount of the resist solution based on the control information. The display displays the dispensed amount of the resist solution calculated by the controller.

The operator further inputs a correction value of the dispensed amount of the resist solution to the controller. The correction value is an actual measurement of dispensed amount per predetermined drive pulse. In this case, the controller corrects a calculated dispensed amount of the resist solution with a correction value. The operator further inputs a target dispensed amount of the resist solution to the controller. In this case, the controller corrects a dispensing time or dispensing speed specified by the control information with the correction value so that the actual dispensed amount will become equal to the target dispensed amount of the resist solution inputted to the controller.

SUMMARY OF THE INVENTION

However, the conventional example with such a construction has the following problem.

When the dispensed amount per predetermined drive pulse is not constant, the dispensed amount of the resist solution cannot be adjusted appropriately only by corrected the dispensing time or dispensing speed. The dispensed amount per predetermined drive pulse being not constant refers to the case where the dispensed amount per predetermined drive pulse varies with an increase in the number of pulses, for example.

This invention has been made having regard to the state of the art noted above, and its object is to provide a pumping apparatus and a substrate treating apparatus which can adjust a dispensed amount of liquid with high accuracy.

To fulfill the above object, this invention provides the following construction.

A pumping apparatus for dispensing a liquid, according to this invention, comprises a pump chamber for storing the liquid, the pump chamber being configured to dispense the liquid in the pump chamber outside the pump chamber by reduction of a volume in the pump chamber; a movable member which is movable to change the volume in the pump chamber; an actuator connected to the movable member for moving the movable member; and a controller for controlling the actuator; wherein the controller is configured to determine an imaginary terminal point by referring to a dispense command including information concerning a target dispensed amount which is a target value of dispensed amount of the liquid dispensed from the pump chamber, theoretical information concerning a theoretical relationship between a position of the movable member and the dispensed amount, and a start position of the movable member; correct the imaginary terminal point to a target position by referring to correction information concerning a difference between a theoretical relationship of the position of the movable member and the dispensed amount, and an actual relationship of the position of the movable member and the dispensed amount; and output a drive command to the actuator for moving the movable member from the start position to the target position.

The controller determines the imaginary terminal point using the dispense command, theoretical information, and start position. The controller corrects the imaginary terminal point to the target position using the correction information. The controller controls the actuator based on the target position. The actuator moves the movable member from the start position to the target position. With the movement of the movable member, the internal volume of the pump chamber decreases and the pump chamber dispenses the liquid outside the pump chamber.

Here, the target position is not the imaginary terminal point itself but is a position to which the imaginary terminal point has been corrected. Especially the correction information used in the correction is information concerning a difference of an actual relationship between the position of the movable member and the dispensed amount, from a theoretical relationship between the position of the movable member and the dispensed amount. Consequently, wherever the imaginary terminal point may be, the controller can determine an appropriate target position. Therefore, the amount of the liquid actually dispensed from the pump chamber can be approximated conveniently to the target dispensed amount specified by the dispense command. That is, pumping apparatus can adjust the actual dispensed amount with high accuracy.

In the above pumping apparatus, it is preferred that the theoretical information correlates a theoretical value of the dispensed amount at a time when the movable member reaches from a first reference position to a first position, and the first position; the correction information correlates a theoretical position and an actual position; and the theoretical value of the dispensed amount at a time when the movable member reaches from a second reference position to the theoretical position is equal to an actual value of the dispensed amount at a time when the movable member reaches from the second reference position to the actual position correlated with the theoretical position.

The theoretical information correlates theoretical values of the first position and dispensed amount. The first position is a position to which the movable member reaches from the first reference position. The theoretical value of the dispensed amount is a theoretical dispensed amount at the time when the movable member reaches from the first reference position to the first position. Since the theoretical information is composed in this way, the controller can conveniently determine the imaginary terminal point using the theoretical information.

The correction information correlates the theoretical position and actual position. Here, the theoretical value of dispensed amount at the time when the movable member reaches from the second reference position to the theoretical position is equal to the actual value of dispensed amount at the time when the movable member reaches from the second reference position to the actual position. In other words, the theoretical position in the correction information is a theoretical position to which the movable member should reach from the second reference position in order to dispense an arbitrary dispensed amount (e.g. a first amount) of the liquid. The actual position in the correction information is an actual position to which the movable member should reach from the second reference position in order to dispense the same amount as the arbitrary dispensed amount (e.g. the first amount) of the liquid. Since the correction information is composed in this way, the controller can conveniently correct the imaginary terminal point to the target position using the correction information.

In the above pumping apparatus, it is preferred that the start position is a current position of the movable member; and the controller is configured to correct the current position of the movable member to an imaginary starting point by referring to the correction information; and determine the imaginary terminal point by referring to the dispense command, the theoretical information, and the imaginary starting point.

The controller corrects the current position to the imaginary starting point using the correction information. The controller determines the imaginary terminal point based on the imaginary starting point. Consequently, the controller can conveniently determine the target position of the movable member starting from the current position. Therefore, wherever the current position of the moving member may be, the current position of the moving member can be made the start position.

In the above pumping apparatus, it is preferred that the controller is configured to determine, as the imaginary starting point, the theoretical position correlated with the actual position equal to the current position of the movable member in the correction information; determine, as an initial dispensed amount, the theoretical value of the dispensed amount correlated with the first position equal to the imaginary starting point in the theoretical information; determine a total amount which is a sum of the initial dispensed amount and the target dispensed amount; determine, as the imaginary terminal point, the first position correlated with the theoretical value of the dispensed amount equal to the total amount in the theoretical information; and determine, as the target position, the actual position correlated with the theoretical position equal to the imaginary terminal point in the correction information.

Through the above processes, the controller can conveniently determine the imaginary starting point, imaginary terminal point and target position.

In the above pumping apparatus, it is preferred that the pumping apparatus comprises a sensor for detecting at least one of a drive amount of the actuator and the position of the movable member; wherein the controller is configured to determine the current position of the movable member based on a detection result of the sensor.

Since the pumping apparatus comprises a sensor, the controller can conveniently determine the actual position of the movable member. The controller can therefore conveniently determine the current position of the movable member.

In the above pumping apparatus, it is preferred that the controller is configured to estimate at least one of the imaginary terminal point and the target position based on a straight line or curve for interpolating the theoretical position and the actual position included in the correction information.

By interpolating the correction information, a theoretical position equal to the imaginary terminal point can be estimated with high accuracy. Further, an actual position correlated with the theoretical position estimated equal to the imaginary terminal point can be estimated with high accuracy. The controller regards the estimated actual position as the target position. The target position can therefore be conveniently determined even if the correction information does not include a theoretical position equal to the imaginary terminal point.

In the above pumping apparatus, it is preferred that the dispense command includes information concerning a target flow rate which is a target value of flow rate of the liquid dispensed from the pump chamber; and the controller is configured to determine, as a theoretical speed, a theoretical moving speed of the movable member for dispensing the liquid at the target flow rate from the pump chamber, by referring to the theoretical information; correct the theoretical speed to a revised speed by referring to the correction information; and output a drive command to the actuator for moving the movable member at the revised speed.

The controller determines the theoretical speed using the dispense command and theoretical information. The controller corrects the theoretical speed to the revised speed using the correction information. The controller controls the actuator based on the revised speed. Specifically, the drive command includes a command for moving the movable member at the revised speed. The actuator moves the movable member at the revised speed. The pump chamber dispenses the liquid at a flow rate corresponding to the revised speed.

Here, the revised speed is not a theoretical speed itself but a speed to which the theoretical speed is corrected. Especially, the correction information used for the correction is information concerning a difference of an actual relationship between the position of the movable member and the dispensed amount from a theoretical relationship between the position of the movable member and the dispensed amount. Therefore, the flow rate of the liquid actually dispensed from the pump chamber can conveniently be approximated to the target flow rate. That is, the flow rate of the liquid dispensed from the pump chamber can be adjusted with high accuracy.

In the above pumping apparatus, it is preferred that the controller is configured to determine a plurality of sections included between the start position and the target position by referring to the correction information; correct the theoretical speed to the revised speed for each of the sections by referring to the correction information; and output a drive command for moving the movable member through each of the sections at the revised speed for each of the sections.

The controller determines a plurality of sections. The controller corrects the theoretical speed for each section. Consequently, the controller determines a revised speed for each section. The controller controls the actuator based on the revised speed for each section. Specifically, the drive command includes a command for moving the movable member through each section at the revised speed for each section. Thus, the controller can finely set the moving speed of the movable member. Therefore, the flow rate of the liquid actually dispensed from the pump chamber can conveniently be further approximated to the target flow rate. That is, the flow rate of the liquid dispensed from the pump chamber can be adjusted with increased accuracy.

In the above pumping apparatus, it is preferred that the correction information includes one intermediate actual position which is an actual position located between the start position and the target position; and the sections include a first section from the start position to the intermediate actual position; and a second section from the intermediate actual position to the target position.

The controller, using the intermediate actual position, can conveniently determine two sections (specifically, the first section and second section) included between the start position and the target position.

In the above pumping apparatus, it is preferred that the correction information includes one intermediate theoretical position which is a theoretical position correlated with the intermediate actual position; and the controller is configured to correct the current position of the movable member to the imaginary starting point by referring to the correction information; determine an imaginary first section from the imaginary starting point to the intermediate theoretical position; determine an imaginary second section from the intermediate theoretical position to the imaginary terminal point; calculate a first revised speed by multiplying the theoretical speed by a value obtained from dividing a distance of the first section by a distance of the imaginary first section; calculate a second revised speed by multiplying the theoretical speed by a value obtained from dividing a distance of the second section by a distance of the imaginary second section; output a drive command to the actuator for moving the movable member at the first revised speed through the first section;

and output a drive command to the actuator for moving the movable member at the second revised speed through the second section.

By carrying out the above processes, the controller can conveniently determine revised speeds for the two sections, respectively. Specifically, the controller can conveniently determine a first revised speed for the first section, and a second revised speed for the second section, respectively. The controller controls the actuator based on the first revised speed and second revised speed. Specifically, the drive command includes a command for moving the movable member at the first revised speed through the first section, and a command for moving the movable member at the second revised speed through the second section.

In the above pumping apparatus, it is preferred that the correction information includes a plurality of intermediate actual positions which are actual positions located between the start position and the target position; and the sections include a first section from the start position to one of the intermediate actual positions nearest to the start position; a middle section between two adjacent ones of the intermediate actual positions; and a second section from one of the intermediate actual positions nearest to the target position to the target position.

The controller, using the plurality of intermediate actual positions, can conveniently determine three or more sections included between the start position and the target position. Specifically, the controller can conveniently determine one first section, one second section, and one or more middle section(s).

In the above pumping apparatus, it is preferred that the correction information includes a plurality of intermediate theoretical positions which are theoretical positions correlated with the intermediate actual positions, respectively; and the controller is configured to correct the current position of the movable member to the imaginary starting point by referring to the correction information; determine an imaginary first section from the imaginary starting point to one of the intermediate theoretical positions nearest to the imaginary starting point; determine an imaginary middle section between two adjacent ones of the intermediate theoretical positions; determine an imaginary second section from one of the intermediate theoretical positions nearest to the imaginary terminal point to the imaginary terminal point; calculate a first revised speed by multiplying the theoretical speed by a value obtained from dividing a distance of the first section by a distance of the imaginary first section; calculate a middle revised speed by multiplying the theoretical speed by a value obtained from dividing a distance of the middle section by a distance of the imaginary middle section; calculate a second revised speed by multiplying the theoretical speed by a value obtained from dividing a distance of the second section by a distance of the imaginary second section; output a drive command to the actuator for moving the movable member at the first revised speed through the first section; output a drive command to the actuator for moving the movable member at the middle revised speed through the middle section; and output a drive command to the actuator for moving the movable member at the second revised speed through the second section.

By carrying out the above processes, the controller can conveniently determine revised speeds for three or more sections, respectively. Specifically, the controller can conveniently determine a first revised speed for the first section, a second revised speed for the second section, and a middle revised speed for the middle section, respectively. The controller controls the actuator based on the first revised speed, second revised speed, and middle revised speed. Specifically, the drive command includes a command for moving the movable member at the first revised speed through the first section, a command for moving the movable member at the middle revised speed through the middle section, and a command for moving the movable member at the second revised speed through the second section.

In the above pumping apparatus, it is preferred that the controller includes a storage unit for storing the theoretical information and the correction information.

Since the controller includes a storage unit, the controller can at any time refer to the theoretical information and correction information. The controller can therefore smoothly determine the target position.

In the above pumping apparatus, it is preferred that the controller is configured to receive the dispense command from external equipment; and the dispense command does not include information concerning the start position of the movable member, current position of the movable member, and the target position of the movable member.

The dispense command includes no information concerning the start position, current position, or target position of the movable member. Thus, the dispense command is simple. The external equipment can therefore control the pumping apparatus with a simple command.

In another aspect of the invention, a substrate treating apparatus is provided for treating a substrate, which comprises a holder for holding the substrate; a nozzle for supplying a treating liquid to the substrate held by the holder; and a pumping device connected to the nozzle; wherein the pumping device includes a pump chamber for storing the treating liquid, the pump chamber being configured to dispense the treating liquid in the pump chamber to the nozzle by reduction of a volume in the pump chamber; a movable member which is movable to change the volume in the pump chamber; an actuator connected to the movable member for moving the movable member; and a controller for controlling the actuator; and the controller is configured to determine an imaginary terminal point by referring to a dispense command including information concerning a target dispensed amount which is a target value of dispensed amount of the treating liquid dispensed from the pump chamber, theoretical information concerning a theoretical relationship between a position of the movable member and the dispensed amount, and a start position of the movable member; correct the imaginary terminal point to a target position by referring to correction information concerning a difference between a theoretical relationship of the position of the movable member and the dispensed amount, and an actual relationship of the position of the movable member and the dispensed amount; and output a drive command to the actuator for moving the movable member from the start position to the target position.

The substrate treating apparatus has the pumping device. The pumping device feeds the treating liquid dispensed from the pump chamber to the nozzle. The treating liquid is a liquid for treating the substrate. The pumping device can conveniently approximate an actual dispensed amount to a target dispensed amount specified by the dispense command. That is, the pumping device can adjust the amount of the treating liquid supplied to the nozzle with high accuracy. Therefore, the amount of the treating liquid supplied from the nozzle to the substrate can be adjusted with high accuracy. Specifically, the amount of the treating liquid supplied from the nozzle to the substrate can conveniently be approximated to the target dispensed amount. That is, the amount of the treating liquid supplied to the substrate can be adjusted with high accuracy. Therefore, the quality of treatment performed on the substrate can be improved conveniently.

This specification also discloses the following pumping apparatus:

(1) The pumping apparatus described above, wherein the start position is a position determined beforehand; the imaginary starting point is a theoretical position correlated with an actual position equal to the start position in the correction information; and the controller is configured to determine the imaginary terminal point by referring to the target dispensed amount, the theoretical information, and the imaginary starting point.

When the start position of the movable member is a position determined beforehand, and the imaginary starting point is a theoretical position correlated with the actual position equal to the start position in the correction information, the imaginary starting point is also a position determined beforehand. That is, the imaginary starting point is known. In this case, the controller determines the imaginary terminal point, without determining the imaginary starting point. That is, the controller can omit the process for determining the imaginary starting point. Consequently, the processing by the controller can be simplified.

(2) The pumping apparatus described above, wherein the controller is configured to:

determine a plurality of sections included between the start position and the target position by referring to the correction information;

determine, by referring to the correction information, imaginary sections specified by the theoretical positions correlated with the actual positions equal to positions of opposite ends of each of the section;

determine the theoretical speed of the movable member for each of the imaginary sections by referring to the theoretical information and the dispense command; and correct the theoretical speed for each of the imaginary sections to the revised speed for each of the sections by referring to the correction information.

The controller determines a plurality of sections. The controller determines a plurality of imaginary sections. The controller determines a theoretical speed for each imaginary section. The controller corrects the theoretical speed for each imaginary section. Consequently, the controller determines a revised speed for each section. Thus, the controller can set moving speeds of the movable member further finely. Therefore, the flow rate of the liquid actually dispensed from the pump chamber can conveniently be further approximated to the target flow rate.

(3) The pumping apparatus described above, wherein:

the correction information includes one intermediate theoretical position which is a theoretical position correlated with the intermediate actual position; and the controller is configured to:

determine an imaginary first section from the imaginary starting point to the intermediate theoretical position, and an imaginary second section from the intermediate theoretical position to the imaginary terminal point;

determine a first theoretical speed which is the theoretical speed for the imaginary first section, by referring to the theoretical information and the dispense command;

determine a second theoretical speed which is the theoretical speed for the imaginary second section, by referring to the theoretical information and the dispense command;

calculate a first revised speed by multiplying the first theoretical speed by a value obtained from dividing a distance of the first section by a distance of the imaginary first section, calculate a second revised speed by multiplying the theoretical speed by a value obtained from dividing a distance of the second section by a distance of the imaginary second section;

output a drive command to the actuator for moving the movable member at the first revised speed through the first section; and output a drive command to the actuator for moving the movable member at the second revised speed through the second section.

The controller determines two imaginary sections (specifically, an imaginary first section and an imaginary second section). The controller determines theoretical speeds (specifically, a first theoretical speed and a second theoretical speed) for the two imaginary sections, respectively. The controller corrects the theoretical speeds for the two imaginary sections, respectively, and determines revised speeds (specifically, a first revised speed and a second revised speed) for the two sections. Consequently, the controller can set moving speeds of the movable member further finely.

(4) The pumping apparatus described above, wherein:
the correction information includes a plurality of intermediate theoretical positions which are theoretical positions correlated with the intermediate actual positions, respectively; and
the controller is configured to:
determine an imaginary first section from the imaginary starting point to one of the intermediate theoretical positions nearest to the imaginary starting point;
determine an imaginary middle section between two adjacent ones of the intermediate theoretical positions;
determine an imaginary second section from one of the intermediate theoretical positions nearest to the imaginary terminal point to the imaginary terminal point;
determine a first theoretical speed which is the theoretical speed for the imaginary first section by referring to the theoretical information and the dispense command;
determine a middle theoretical speed which is the theoretical speed for the imaginary middle section by referring to the theoretical information and the dispense command;
determine a second theoretical speed which is the theoretical speed for the imaginary second section by referring to the theoretical information and the dispense command;
calculate a first revised speed by multiplying the first theoretical speed by a value obtained from dividing a distance of the first section by a distance of the imaginary first section;
calculate a middle revised speed by multiplying the middle theoretical speed by a value obtained from dividing a distance of the middle section by a distance of the imaginary middle section;
calculate a second revised speed by multiplying the second theoretical speed by a value obtained from dividing a distance of the second section by a distance of the imaginary second section;
output a drive command to the actuator for moving the movable member at the first revised speed through the first section;
output a drive command to the actuator for moving the movable member at the middle revised speed through the middle section; and
output a drive command to the actuator for moving the movable member at the second revised speed through the second section.

The controller determines three or more imaginary sections (specifically, one imaginary first section, one imaginary second section, and one or more imaginary middle section(s)). The controller determines theoretical speeds (specifically, one first theoretical speed, one second theoretical speed, and one or more middle theoretical speed(s)) for the three or more imaginary sections, respectively. The controller corrects the theoretical speeds for the three or more imaginary sections, respectively. Consequently, the controller determines revised speeds (specifically, one first revised speed, one second revised speed, and one or more middle revised speed(s)) for the three or more sections. Thus, the controller can set moving speeds of the movable member further finely.

(5) The pumping apparatus described above, further comprising a movable partition member demarcating at least part of the pump chamber, the movable partition member being deformable by movement of the movable member.

The pumping apparatus includes the movable partition member. Therefore, the actuator can conveniently change the volume in the pump chamber by moving the movable member.

(6) The pumping apparatus described above, wherein the movable partition member is at least one of a diaphragm, a tubephragm, and a bellows.

The above can conveniently realize the movable partition member.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 5 is a view schematically showing a process of determining a target position;

DESCRIPTION OF THE PREFERRED EMBODIMENTS

An embodiment of this invention will be described hereinafter with reference to the drawings.

Figure 1:
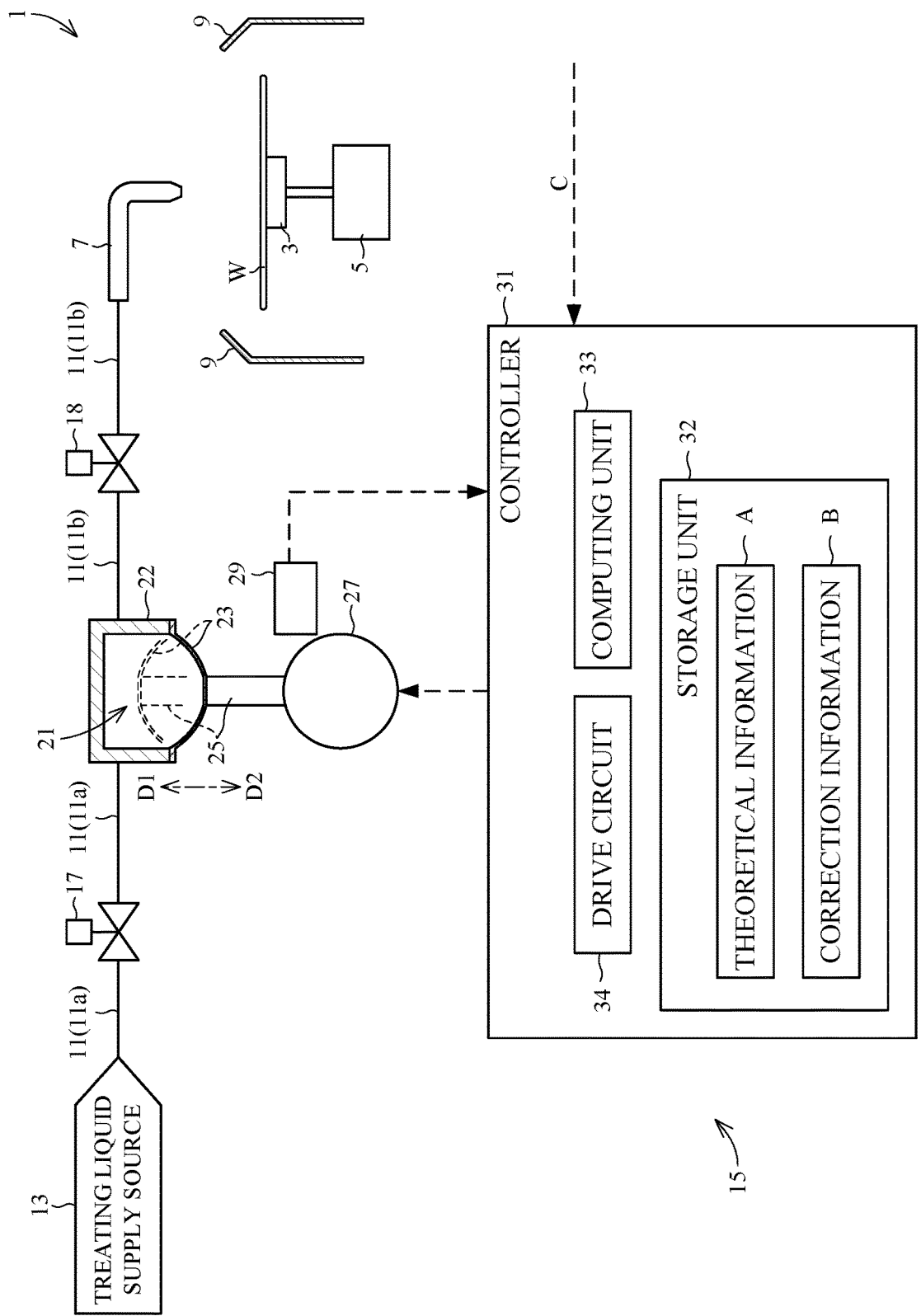
FIG. 1 is a view showing an outline construction of a substrate treating apparatus according to an embodiment.

FIG. 1 is a view showing an outline construction of a substrate treating apparatus according to the embodiment. A substrate treating apparatus 1 according to the embodiment is an apparatus which performs treatment for supplying a treating liquid to substrates (e.g. semiconductor wafers) W.

1. Outline of Substrate Treating Apparatus 1

The substrate treating apparatus 1 has a holder 3 and a spin motor 5. The holder 3 holds a wafer W substantially horizontally. The holder 3 holds the back side surface (lower surface) of the wafer W by suction, for example. The spin motor 5 is connected to the center of a bottom of the holder 3. The spin motor 5 spins the holder 3 about a substantially vertical axis. Consequently, the wafer W held by the holder 3 spins about the substantially vertical axis.

The substrate treating apparatus 1 has a nozzle 7 and a cup 9. The nozzle 7 is provided movable to a dispensing position above the holder 3. The nozzle 7 dispenses the treating liquid to the wafer W held by the holder 3. The cup 9 is disposed to surround lateral areas of the holder 3. The cup 9 receives and collects the treating liquid scattering from the wafer W.

The substrate treating apparatus 1 has piping 11 and a treating liquid supply source 13. The piping 11 has a first end connected to the nozzle 7. The piping 11 has a second end connected to the treating liquid supply source 13. The treating liquid supply source 13 is a treating liquid tank which stores the treating liquid, for example. The treating liquid is, for example, a resist film material, various coating materials, chemical solutions, thinner, or deionized water.

The treating liquid in the treating liquid supply source 13 flows from the treating liquid supply source 13 to the nozzle 7 through the piping 11.

The substrate treating apparatus 1 has a pumping device 15. The pumping device 15 is mounted on the piping 11. The pumping device 15 sucks the treating liquid supplied from the treating liquid supply source 13, and feeds the sucked treating liquid to the nozzle 7. The treating liquid is an example of the liquid in this invention.

Here, a portion of the piping 11 upstream of the pumping device 15 is called "primary piping 11a" and a portion of the piping 11 downstream of the pumping device 15 "secondary piping 11b". The primary piping 11a has a first end connected to the pumping device 15, and a second end connected to the treating liquid supply source 13. The secondary piping 11b has a first end connected to the pumping device 15, and a second end connected to the nozzle 7.

The substrate treating apparatus 1 has switch valves 17 and 18. The switch valve 17 is mounted on the primary piping 11a. The switch valve 17 opens and closes a flow path of the treating liquid through the primary piping 11a. The switch valve 18 is mounted on the secondary piping 11b. The switch valve 18 opens and closes a flow path of the treating liquid through the secondary piping 11b.

2. Construction of Pumping Device 15

The pumping device 15 has a pump chamber 21. The pump chamber 21 has an interior space. The interior space assumes a cylindrical shape, for example. The pump chamber 21 stores the treating liquid in the interior space. The pump chamber 21 is connected to the primary piping 11a and secondary piping 11b.

The pump chamber 21 is demarcated by a housing 22 and a diaphragm 23. The housing 22 assumes a cylindrical shape. The housing 22 has one end portion with an opening formed therein. The housing 22 is not deformable. More particularly, the housing 22 does not deform with movement of a piston 25 described hereinafter. The housing 22 is connected to the primary piping 11a and secondary piping 11b. The diaphragm 23 is attached to the one end portion of the housing 22, and closes the opening of the housing 22. Consequently, the pump chamber 21 is closed. The diaphragm 23 is deformable. More particularly, the diaphragm 23 deforms with movement of the piston 25 described hereinafter. The material of the diaphragm 23 is a synthetic resin, for example. A deformation of the diaphragm 23 varies the volume of the pump chamber 21. A decrease in the volume of the pump chamber 21 will result in the pump chamber 21 dispensing the treating liquid outside the pump chamber 21 (to the secondary piping 11b). An increase in the volume of the pump chamber 21 will result in the pump chamber 21 sucking the treating liquid into the pump chamber 21 from outside the pump chamber 21 (from the primary piping 11a). The diaphragm 23 is an example of the movable partition member in this invention.

An amount of the treating liquid dispensed from the pump chamber 21 will hereinafter be called "dispensed amount" as appropriate.

The pumping device 15 has the piston 25 and a motor 27. The piston 25 has a first end connected to the motor 27. The motor 27 moves the piston 25. Thus, the piston 25 is provided movable. The piston 25 is an example of the movable member in this invention.

The motor 27 and piston 25 are connected through a mechanism, not shown, which converts rotational motion of the motor 27 into linear motion of the piston 25. When the motor 27 rotates forward and reverse, the piston 25 will make reciprocating linear movement relative to the motor 27. FIG. 1 shows, by way of example, directions D1 and D2 of the movement of the piston 25. The moving distance of the piston 25 is proportional to the amount of rotation (angles) of the motor 27. The moving speed of the piston 25 is proportional to the rotating speed of the motor 27.

The motor 27 is a stepping motor. The motor 27 is driven by pulses (electric pulse signal). The amount of rotation of the motor 27 and the amount of movement of the piston 25 are proportional to the number of pulses. The rotating speed of the motor 27 and the moving speed of the piston 25 are proportional to the pulse rate (frequency of pulse). The motor 27 is an example of the actuator in this invention.

The piston 25 has a second end attached to an outer surface of the diaphragm 23. The piston 25 is connected to the diaphragm 23. When the piston 25 moves relative to the pump chamber 21, the diaphragm 23 will be deformed to change the volume in the pump chamber 21. When the piston 25 moves in the direction D1, the piston 25 approaches the pump chamber 21 to decrease the volume in the pump chamber 21. When the piston 25 moves in the direction D2, the piston 25 moves away from the pump chamber 21 to increase the volume in the pump chamber 21.

The pumping device 15 has an encoder 29. The encoder 29 is attached to the motor 27. The encoder 29 detects amounts of rotation of the motor 27. The encoder 29 is an example of the sensor in this invention.

The pumping device 15 has a controller 31. The controller 31 is electrically connected to the motor 27 and encoder 29. The controller 31 controls the motor 27. The controller 31 receives detection results from the encoder 29.

The controller 31 is further connected to external equipment, not shown, of the pumping device 15 for communication therewith. The external equipment is at least either a higher-order controller which controls the pumping device 15 or an input unit operated by the user, for example. The controller 31 receives a dispense command C from the external equipment. The dispense command C includes information concerning a target dispensed amount and information concerning a target flow rate. The target dispensed amount is a target value of dispensed amount. The target flow rate is a target value of flow rate of the treating liquid dispensed from the pump chamber 21.

The controller 31 has a storage unit 32, a computing unit 33, and a drive circuit 34. The storage unit 32 stores theoretical information A and correction information B. The computing unit 33 processes the dispense command C by referring to the theoretical information A and correction information B stored in the storage unit 32. The drive circuit 34 outputs to the motor 27 a drive command (pulses) based on a processing result of the computing unit 33.

The theoretical information A relates to a theoretical relationship between position of the piston 25 and dispensed amount.

For example, the theoretical information A correlates a first position and a theoretical value of dispensed amount. The first position is a position to which the piston 25 reaches from a first reference position.

The theoretical value of dispensed amount is a theoretical dispensed amount. Specifically, the theoretical value of dispensed amount is a theoretical dispensed amount when the piston 25 reaches from the first reference position to the first position. Thus, the theoretical information A is information based on the first reference position. The first position is a theoretical position of the piston 25.

Figures 2, 3:
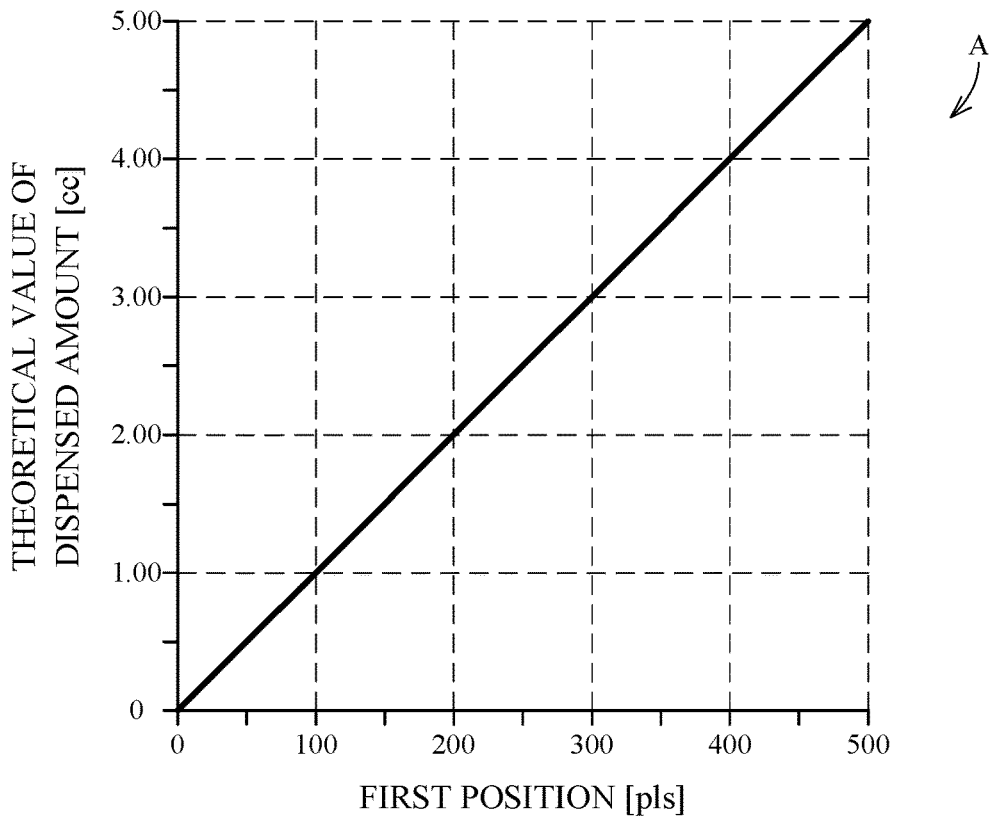
FIG. 2 is a view schematically illustrating theoretical information by way of example.
FIG. 3 is a view schematically illustrating correction information by way of example.

FIG. 2 is a view schematically illustrating the theoretical information by way of example. The theoretical information A shown in FIG. 2 is a graph in which the horizontal axis represents the first position [pls] based on the number of pulses, and the vertical axis the theoretical value [cc] of dispensed amount. The number of pulses [pls] is an index indicating the position of the piston 25. In the theoretical information A of FIG. 2, the first reference position is 0 [pls]. That is, the theoretical value of dispensed amount in the first reference position is 0 [cc]. Specifically, when the first position is equal to the first reference position, the theoretical value of dispensed amount is 0 [cc]. In the theoretical information A of FIG. 2, for example, the first position 100 [pls] and theoretical value 1 [cc] of dispensed amount are correlated. This shows that the theoretical value of dispensed amount is 1 [cc], when the piston 25 reaches from the first reference position (0 [pls]) to the first position of 100 [pls].

The theoretical information A is, for example, specifications, theoretical data, or design data showing the relationship between position of the piston 25 and dispensed amount.

The correction information B relates to a difference of an actual relationship between position of the piston 25 and dispensed amount from a theoretical relationship between position of the piston 25 and dispensed amount.

For example, the correction information B correlates theoretical position and actual position. Here, the theoretical position and actual position in the correction information B have the following relationship. A theoretical value of dispensed amount when the piston 25 reaches from a second reference position to a theoretical position is equal to an actual value of dispensed amount when the piston 25 reaches from the second reference position to an actual position corresponding to the theoretical position. In other words, the theoretical position in the correction information B is a position to which the piston 25 should theoretically reach from the second reference position in order to dispense an arbitrary dispensed amount (e.g. a first amount) of the treating liquid. The actual position in the correction information B is a position to which the piston 25 should actually reach from the second reference position in order to dispense the same amount (e.g. the first amount) of the treating liquid as the arbitrary dispensed amount. Thus, the correction information B is information based on the second reference position. The theoretical position is a theoretical position of the piston 25. The relationship between the theoretical position and the theoretical value of dispensed amount is the same as the relationship between the first position and the theoretical value of dispensed amount specified in the theoretical information A. The first position is essentially the same as the theoretical position. In this specification, in order to distinguish from the theoretical position in the correction information B, the position in the theoretical information A is called the "first position". The actual position is an actual position of the piston 25. The actual position refers to an actual measurement of the position of the piston 25, or an experimental value of the position of the piston 25, for example. The actual value of dispensed amount is an actual dispensed amount. The actual value of dispensed amount is an actual measurement of dispensed amount, or an experimental value of dispensed amount, for example.

FIG. 3 is a view schematically illustrating the correction information by way of example. The correction information B shown in FIG. 3 is a table correlating the theoretical position and the actual position. The correction information B includes seven pairs of theoretical positions and actual positions correlated with one another. For expediency, FIG. 3 shows pair numbers 0, 1, 2, . . . , 6. The theoretical positions and actual positions are indicated by the numbers of pulses [pls], respectively. FIG. 3 shows dispensed amounts for reference. The dispensed amounts shown in FIG. 3 mean both theoretical values of dispensed amount and actual values of dispensed amount. In the correction information B of FIG. 3, the second reference position is 0 [pls]. That is, the dispensed amount in the second reference position is 0 [cc]. Specifically, when the theoretical position is equal to the second reference position, the theoretical value of dispensed amount is 0 [cc], and when the actual position is equal to the second reference position, the actual value of dispensed amount is 0 [cc]. Thus, the second reference position is the same as the first reference position in the theoretical information A.

At pair number "1" in the correction information B of FIG. 3, theoretical position 50 [pls] and actual position 25 [pls] are correlated. This indicates that the theoretical value (0.5 [cc]) of dispensed amount when the piston 25 has moved from the second reference position (0 [pls]) to theoretical position 50 [pls] is equal to the actual value (0.5 [cc]) of dispensed amount when the piston 25 has moved from the second reference position to actual position 25 [pls].

The theoretical value of dispensed amount when the piston 25 has moved from the second reference position to the theoretical position is specified by the theoretical information A. The actual position to which the piston 25 reaches from the second reference position, and the actual value of dispensed amount when the piston 25 has reached from the second reference position to the actual position are measured by experiment, for example. The correction information B is therefore created based on the following two items:
  1. theoretical information A, and
  2. an actual relationship between and the position of the piston 25 and dispensed amount.

The theoretical positions included in the correction information B may be discrete compared with the first positions included in the theoretical information A. The range of the theoretical positions included in the correction information B may be smaller than the range of the first positions included in the theoretical information A.

The controller 31 is realized by a processor (e.g. central processing unit (CPU)) which performs various processes, a RAM (Random-Access Memory) used as working space for arithmetic processes, and semiconductor memory for storing a variety of information, for example.

3. Example of Operation of Pumping Device 15

Figure 4:
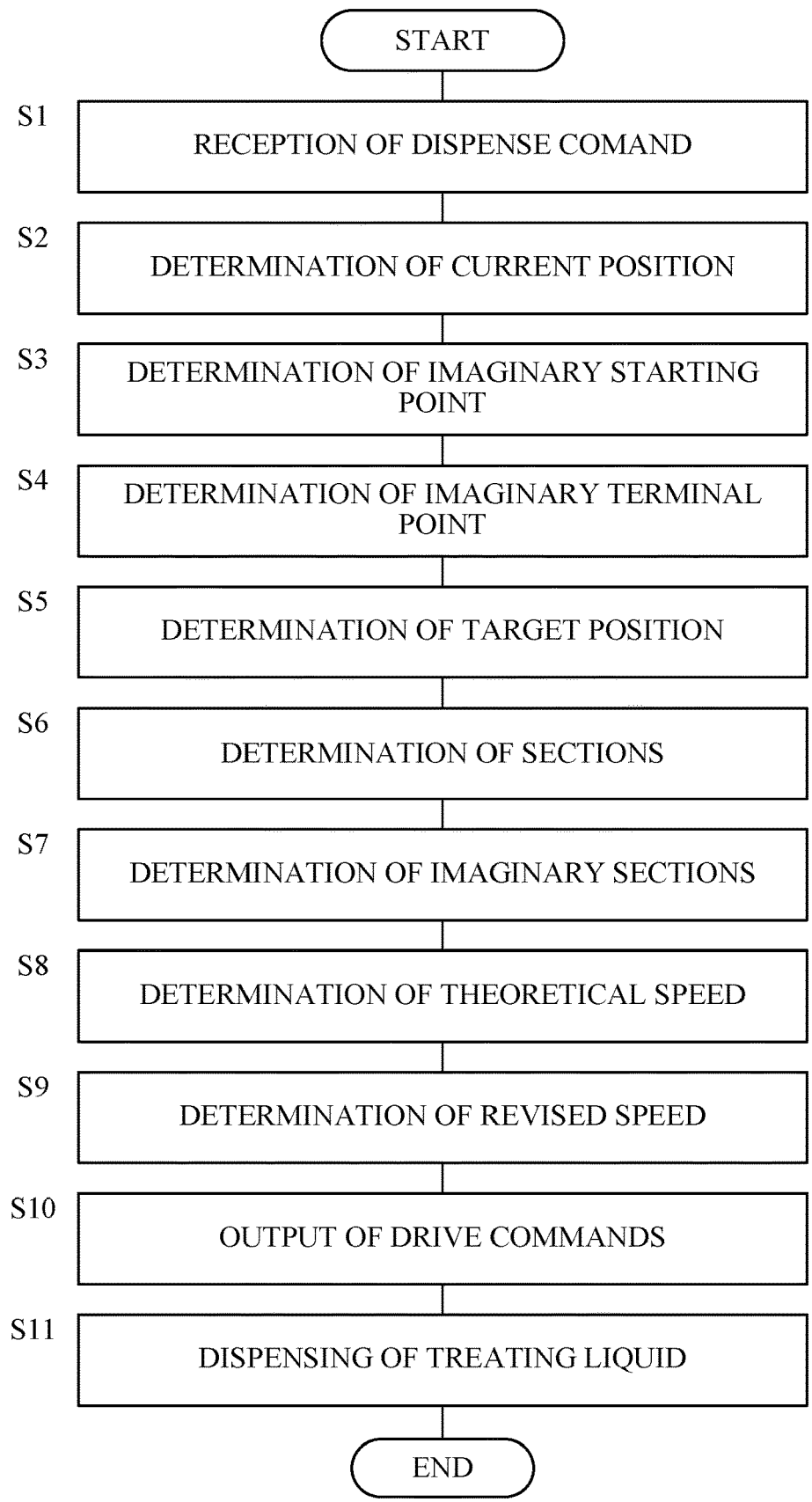
FIG. 4 is a view showing a procedure of operation of a pumping device.

FIG. 4 is a view showing a procedure of operation of the pumping device 15.

<Step S1> Reception of Dispense Command

The controller 31 receives a dispense command C from the external equipment not shown. The dispense command C includes information concerning a target dispensed amount and information concerning a target flow rate.

<Step S2> Determination of Current Position

The computing unit 33 determines a current position of the piston 25 based on a detection result of the encoder 29. The current position is a position of the piston 25 at the time when the computing unit 33 executes this step S2, for example. Alternatively, the current position is a position of the piston 25 at the time when the pumping device 15 (pump chamber 21) completes an operation to suck the treating liquid, for example. The current position may be a position of the piston 25 at the time, for example, after the pumping device 15 (pump chamber 21) completes an operation to suck the treating liquid, and before the pumping device 15 (pump chamber 21) starts an operation to dispense the treating liquid. The controller 31 regards the current position of the piston 25 as a start position of the piston 25 as described hereinafter.

<Step S3> Determination of Imaginary Starting Point

The computing unit 33 corrects the current position of the piston 25 to an imaginary starting point by referring to the correction information B stored in the storage unit 32. Specifically, the computing unit 33 determines, as the imaginary starting point, a theoretical position matched with the actual position equal to the current position of the piston 25 in the correction information B. In other words, the controller 31 regards the current position as the actual position in the correction information B, converts the actual position into the theoretical position using the correction information B, and determines the converted theoretical position as the imaginary starting point.

Here, a process carried out with processing conditions 1 below by the computing unit 33 will be illustrated by way of example.

(Processing conditions 1)
target dispensed amount: 2.25 [cc]
target flow rate: 1 [cc/sec]
current position Q of piston 25: 25 [pls]
theoretical information A: graph shown in FIG. 2
correction information B: table shown in FIG. 3

FIG. 5 is a view schematically showing a process of determining a target position under processing conditions 1. The view in the upper portion of FIG. 5 is a graph plotting the correction information B shown in FIG. 3. The graph in the upper portion of FIG. 5 will hereinafter be called the "correction graph Bg". The horizontal axis of the correction graph Bg represents the theoretical position, and the vertical axis the actual position. Numerals 0, 1, . . . , 6 affixed to points P in the correction graph Bg indicate the pair numbers in the correction information B. For example, point P1 is coordinates of the theoretical position and actual position at pair number 1. The view in the lower portion of FIG. 5 is the same theoretical information A as FIG. 2.

Reference is made to FIGS. 3 and 5. With processing conditions 1, the computing unit 33 determines imaginary starting point q by the following procedure. Since the current position Q of the piston 25 is 25 [pls], the actual position equal to the current position Q of the piston 25 is 25 [pls]. The theoretical position matched with the actual position 25 [pls] in the correction information B is 50 [pls]. Therefore, 50 [pls] is imaginary starting point q. Sign a in the correction graph Bg schematically indicates the process for determining imaginary starting point q.

<Step S4> Determination of Imaginary Terminal Point

The computing unit 33 determines an imaginary terminal point by referring to the dispense command C, theoretical information A, and imaginary starting point. Specifically, the computing unit 33 determines, as an initial dispensed amount, a theoretical value of dispensed amount matched with the position equal to the imaginary starting point in the theoretical information A. The computing unit 33 determines a total amount which is a sum of the initial dispensed amount and target dispensed amount. The controller 31 determines, as the imaginary terminal point, the first position in the theoretical information A matched with the theoretical value of dispensed amount equal to the total amount.

Reference is made to FIGS. 3 and 5. With the processing conditions 1, the computing unit 33 determines imaginary terminal point r by the following procedure. Since the imaginary starting point q is 50 [pls], the first position equal to the imaginary starting point q is 50 [pls]. The theoretical value of dispensed amount matched with first position 50 [pls] in the theoretical information A is 0.5 [cc]. Therefore, 0.5 [cc] is the initial dispensed amount. Sign b in the theoretical information A of FIG. 5 schematically indicates the process for determining the initial dispensed amount.

The target dispensed amount specified by the dispense command C is 2.25 [cc]. Therefore, the total amount of the initial dispensed amount and target dispensed amount is 2.75 [cc]. Sign c in the theoretical information A of FIG. 5 schematically indicates the process for determining the total amount.

In the theoretical information A, the first position matched with the theoretical value of dispensed amount equal to the total amount is 275 [pls]. Therefore, 275 [pls] is imaginary terminal point r. Sign d in the theoretical information A of FIG. 5 schematically indicates the process for determining imaginary terminal point r.

<Step S5> Determination of Target Position

The computing unit 33 corrects the imaginary terminal point to a target position by referring to the correction information B. Specifically, the actual position matched with the theoretical position equal to the imaginary terminal point in the correction information B is determined as the target position. In other words, the controller 31 converts the imaginary terminal point back to the target position using the correction information B.

Reference is made to FIGS. 3 and 5. With the processing conditions 1, the computing unit 33 determines target position R by the following procedure. Since imaginary terminal point r is 275 [pls], the theoretical position equal to imaginary terminal point r is 275 [pls]. The actual position matched with theoretical position 275 [pls] in the correction information B is 200 [pls]. Therefore, 200 [pls] is the target position R. Sign e in the correction graph Bg schematically indicates the process for determining the target position R.

<Step S6> Determination of Sections

The computing unit 33 determines sections included between the current position and target position by referring to the correction information B. Each section does not overlap the others. The correction information B includes an actual position located between the current position and target position. In other words, the correction information B includes an actual position larger than the current position and smaller than the target position. Each section is delimited by the actual position located between the current position and target position in the correction information B. An actual position located between the current position and target position will be hereinafter called "intermediate actual position" as appropriate.

With the processing conditions 1, the computing unit 33 determines the sections by the following procedure. Since current position Q is 25 [pls] and target position R is 200 [pls], the actual positions 50 [pls] and 120 [pls] included in the correction information B are intermediate actual positions, respectively. That is, the correction information B includes two intermediate actual positions 50 [pls] and 120 [pls]. The intermediate actual position nearest to current position Q is 50 [pls]. The intermediate actual position nearest to target position R is 120 [pls]. Therefore, the sections included between current position Q and target position R are the following three:

first section: from current position Q (25 [pls]) to the intermediate actual position (50 [pls])
middle section: from the intermediate actual position (50 [pls]) to the intermediate actual position (120 [pls])
second section: from the intermediate actual position (120 [pls]) to target position R (200 [pls])

<Step S7> Determination of Imaginary Sections

The computing unit 33 specifies an imaginary section corresponding to each section by referring to the correction information B. In other words, the controller 31 converts each section to an imaginary section using the correction information B. Each imaginary section is included between the imaginary starting point and imaginary terminal point. Each imaginary section is specified by theoretical positions matched with actual positions equal to the positions of opposite ends of each section. Each imaginary section is delimited by the theoretical position matched with the intermediate actual position in the correction information B. The theoretical position matched with the intermediate actual position will be hereinafter called "intermediate theoretical position" as appropriate.

With the processing conditions 1, the computing unit 33 determines the imaginary sections by the following procedure. The imaginary starting point q is 50 [pls]. The imaginary terminal point r is 275 [pls]. The intermediate theoretical position matched with intermediate actual position 50 [pls] in the correction information B is 100 [pls]. The intermediate theoretical position matched with intermediate actual position 120 [pls] in the correction information B is 200 [pls]. The intermediate theoretical position nearest to imaginary starting point q is 100 [pls]. The intermediate theoretical position nearest to imaginary terminal point r is 200 [pls]. Therefore, the imaginary sections are the following three:

- imaginary first section: from imaginary starting point q (50 [pls]) to the intermediate theoretical position (100 [pls])
- imaginary middle section: from the intermediate theoretical position (100 [pls]) to the intermediate theoretical position (200 [pls])
- imaginary second section: from the intermediate theoretical position (200 [pls]) to imaginary terminal point r (275 [pls])

Here, the imaginary first section corresponds to the first section. The imaginary middle section corresponds to the middle section. The imaginary second section corresponds to the second section.

<Step S8> Determination of Theoretical Speed

The computing unit 33 determines a theoretical speed by referring to the theoretical information A. The theoretical speed is a theoretical moving speed of the piston 25 for dispensing the treating liquid at the target flow rate. That is, by referring to the theoretical information A, the computing unit 33 determines, as the theoretical speed, a theoretical moving speed of the piston 25 for dispensing the treating liquid at the target flow rate.

With processing conditions 1, the computing unit 33 determines the theoretical speed by the following procedure. The target flow rate specified by the dispense command C is 1 [cc/sec]. In the theoretical information A, the theoretical value of dispensed amount is proportional to the difference between the first reference position and the first position. The difference between the first reference position and the first position corresponds to the moving distance of the piston 25. In the theoretical information A, therefore, the theoretical value of dispensed amount is proportional to the moving distance of the piston 25. Specifically, with every increase of 100 [pls] in the moving distance of the piston 25, the theoretical value of dispensed amount increases 1 [cc]. Therefore, the theoretical speed of the piston 25 is 100 [pls/sec] uniformly for all imaginary sections. Here, the pulse rate [pls/sec] is an index indicating the speed of the piston 25.

<Step S9> Determination of Revised Speed

The computing unit 33 corrects the theoretical speed to a revised speed by referring to the correction information B. Specifically, the controller 31 corrects the theoretical speed for each section. Consequently, the controller 31 determines a revised speed for each section. The revised speed for each section is a value obtained from multiplying the theoretical speed by a value obtained from dividing the distance of the section by the distance of the imaginary section corresponding to the section. Here, the distance of the section is the difference between the position at the first end of the section and the position at the second end thereof. The distance of the imaginary section is the difference between the position in the first end of the imaginary section and the position in the second end thereof.

In processing conditions 1, the computing unit 33 determines revised speeds by the following procedure. The revised speeds for the above first section, middle section, and second section, respectively, are called herein the "first revised speed", "middle revised speed", and "second revised speed".

The first revised speed is calculated from the following equation:

$$\begin{aligned} \text{first revised speed} &= \text{theoretical speed} \times (\text{distance of first section}) \div \\ &\quad (\text{distance of imaginary first section}) \\ &= 100 \times (50 - 25) \div (100 - 50) \\ &= 50 \text{ [pls/sec]} \end{aligned}$$

The middle revised speed is calculated from the following equation:

$$\begin{aligned} \text{middle revised speed} &= \text{theoretical speed} \times (\text{distance of middle section}) \div \\ &\quad (\text{distance of imaginary middle section}) \\ &= 100 \times (120 - 50) \div (200 - 100) \\ &= 70 \text{ [pls/sec]} \end{aligned}$$

The second revised speed is calculated from the following equation:

$$\begin{aligned} \text{second revised speed} &= \text{theoretical speed} \times (\text{distance of second section}) \div \\ &\quad (\text{distance of imaginary second section}) \\ &= 100 \times (200 - 120) \div (275 - 200) \\ &= 107 \text{ [pls/sec]} \end{aligned}$$

<Step S10> Output of Drive Commands

The computing unit 33 gives the determined target position and revised speeds to the drive circuit 34. The drive circuit 34 outputs drive commands corresponding to the target position and revised speeds to the motor 27. Specifically, the drive commands are commands for moving the piston 25 from the current position to the target position. Further, the drive commands are commands for moving the piston 25 at the revised speeds. More particularly, the drive commands are commands for moving the piston 25 through the respective sections at a revised speed corresponding to each section.

With processing conditions 1, the drive circuit 34 outputs the following three drive commands to the motor 27:
- drive command for moving the piston 25 at the first revised speed (50 [pls/sec]) through the first section (i.e. from the current position Q (25 [pls]) to the intermediate actual position (50 [pls]))
- drive command for moving the piston 25 at the middle revised speed (70 [pls/sec]) through the middle section (i.e. from the intermediate actual position (50 [pls]) to the intermediate actual position (120 [pls]))
- drive command for moving the piston 25 at the second revised speed (107 [pls/sec]) through the second section (i.e. from the intermediate actual position (120 [pls]) to the target position R (200 [pls])

<Step S11> Dispensing of Treating Liquid

The motor 27 moves the piston 25 according to the drive commands. The start position of the piston 25 is the current position. The piston 25 moves at the revised speeds from the current position to the target position. The movement of the piston 25 decreases the volume of the pump chamber 21, and the pump chamber 21 dispenses the treating liquid in the pump chamber 21 outside the pump chamber 21. The pump chamber 21 dispenses the treating liquid in an amount corresponding to the moving distance (i.e. the distance from the current position to the target position) of the piston 25. The pump chamber 21 dispenses the treating liquid at flow rates corresponding to the moving speeds of the piston 25.

4. Example of Operation of Substrate Treating Apparatus 1

Operation of the substrate treating apparatus 1 for treating the wafer W with the treating liquid will be described briefly. The holder 3 holds the wafer W. The nozzle 7 moves to the dispensing position. The switch valve 17 is closed. The switch valve 18 is open. The controller 31 controls the motor 27 according to one dispense command C. Consequently, the piston 25 moves and the pump chamber 21 dispenses the treating liquid into the secondary piping 11b. The secondary piping 11b feeds the treating liquid to the nozzle 7. The nozzle 7 supplies the treating liquid to the wafer W held by the holder 3. When the nozzle 7 supplies the treating liquid to the wafer W, the spin motor 5 may spin the wafer W.

After the piston 25 reaches the target position, the piston 25 stands still. The pumping device 15 ends the dispensing of the treating liquid, and the nozzle 7 ends the supplying of the treating liquid. Consequently, the pumping device 15 completes the dispensing operation of the treating liquid corresponding to the one dispense command C.

Then, the pumping device 15 carries out an operation to suck the treating liquid. Specifically, the switch valve 17 is opened and the switch valve 18 is closed. The piston 25 withdraws from the pump chamber 21. The volume of the pump chamber 21 increases and the pump chamber 21 sucks in the treating liquid from the primary piping 11a.

After the pumping device 15 completes the operation for sucking the treating liquid, the switch valve 17 is closed and the switch valve 18 is opened. The pumping device 15 starts an operation according to the next dispense command C.

4. Advantageous Effects of this Embodiment

The pumping device 15 has the controller 31. The controller 31 determines an imaginary terminal point by referring to the dispense command C, theoretical information A, and current position. The controller 31 corrects the imaginary terminal point to a target position using the correction information B. Here, the correction information B is information relating to a difference of an actual relationship between position of the piston 25 and dispensed amount from a theoretical relationship between position of the piston 25 and dispensed amount. An appropriate target position can therefore be determined wherever the imaginary terminal point may be determined. Thus, the amount of the treating liquid actually dispensed from the pump chamber 21 can be approximated conveniently to the target dispensed amount specified by the dispense command C. That is, the dispensed amount of the treating liquid can be adjusted with high accuracy.

The theoretical information A correlates the first position to which the piston 25 reaches from the first reference position, and the theoretical value of dispensed amount when the piston 25 reaches from the first reference position to the first position. The controller 31 can therefore conveniently determine the imaginary terminal point using the theoretical information A.

The correction information B correlates the theoretical position and actual position. Here, the theoretical value of dispensed amount when the piston 25 reaches from the second reference position to the theoretical position is equal to an actual value of dispensed amount when the piston 25 reaches from the second reference position to an actual position correlated with the theoretical position in the correction information B. In other words, the correction information B correlates the theoretical position to which the piston 25 should theoretically reach from the second reference position in order to dispense an arbitrary dispensed amount of the treating liquid, and an actual position to which the piston 25 should actually reach from the second reference position in order to dispense the treating liquid in the same amount as the arbitrary dispensed amount. The controller 31 can therefore conveniently correct the imaginary terminal point to the target position using the correction information B.

The first reference position in the theoretical information A is the same as the second reference position in the correction information B. Therefore, wherever the imaginary terminal point may be, the controller 31 can easily correct the imaginary terminal point to the target position using the correction information B. Similarly, wherever the current position of the piston 25 may be, the controller 31 can easily correct the current position to the imaginary starting point using the correction information B.

The controller 31 corrects the current position of piston 25 to the imaginary starting point with reference to correction information B. The controller 31 determines the imaginary terminal point based on the imaginary starting point by referring to the dispense command C, theoretical information A, and imaginary starting point. Consequently, the controller 31 can conveniently determine the target position to be reached by the piston 25 in the current position. Therefore, wherever the current position of the piston 25 may be, the current position of the piston 25 can be made the start position.

The controller 31 determines, as the imaginary starting point, the theoretical position correlated in the correction information B with the actual position equal to the current position of the piston 25. By this process the controller 31 can conveniently determine the imaginary starting point.

The controller 31 determines, as the initial dispensed amount, the theoretical value of dispensed amount correlated with a position equal to the imaginary starting point in the theoretical information A. The controller 31 determines a total amount which is the sum of the initial dispensed amount and target dispensed amount. The controller 31 determines, as the imaginary terminal point, the first position correlated with the theoretical value of dispensed amount equal to the total amount in the theoretical information A. By this series of processes the controller 31 can conveniently determine the imaginary terminal point.

The controller 31 determines, as the target position, the actual position correlated with the theoretical position equal to the imaginary terminal point in the correction information B. By this process the controller 31 can conveniently determine the target position.

The pumping device 15 has the encoder 29. The controller 31 can therefore conveniently determine the current position of the piston 25.

The controller 31 determines a theoretical speed of the piston 25 by referring to the dispense command C and theoretical information A. The controller 31 corrects the theoretical speed to a revised speed using the correction information B. Here, the correction information B is information concerning the difference of the actual relationship between the position of the piston 25 and the dispensed amount from the theoretical relationship between the position of the piston 25 and the dispensed amount. Therefore, wherever the imaginary terminal point of the piston 25 may be determined, an appropriate revised speed can be determined. Thus, the flow rate of the treating liquid actually dispensed from the pump chamber 21 can be approximated conveniently to the target flow rate specified by the dispense command C. That is, the flow rate of the treating liquid can be adjusted with high accuracy.

The controller 31 determines a plurality of sections included between the current position and the target position using the correction information B. The controller 31, using the correction information B, corrects the theoretical speed for each section, and determines a revised speed for each section. Consequently, the controller 31 can finely set moving speeds of the piston 25. Thus, the flow rate of the treating liquid actually dispensed from the pump chamber 21 can be further approximated to the target flow rate.

The controller 31, using two intermediate actual positions, can conveniently determine three sections (i.e. a first section, a middle section, and a second section) included between the current position and the target position.

The controller 31 calculates a first revised speed from the distance of the first section, the distance of an imaginary first section, and a theoretical speed. And the controller 31 outputs a drive command to the motor 27 for moving the piston 25 at the first revised speed through the first section. Consequently, when the piston 25 moves through the first section, the flow rate of the treating liquid actually dispensed from the pump chamber 21 can be conveniently approximated to the target flow rate.

Similarly, the controller 31 calculates a middle revised speed for the middle section, and outputs a drive command to the motor 27 for moving the piston 25 at the middle revised speed through the middle section. Consequently, when the piston 25 moves through the middle section also, the flow rate of the treating liquid actually dispensed from the pump chamber 21 can be conveniently approximated to the target flow rate.

Similarly, the controller 31 calculates a second revised speed for the second section, and outputs a drive command to the motor 27 for moving the piston 25 at the second revised speed through the second section. Consequently, when the piston 25 moves through the second section also, the flow rate of the treating liquid actually dispensed from the pump chamber 21 can be conveniently approximated to the target flow rate.

The controller 31 has the storage unit 32. The controller 31 can therefore always refer to the theoretical information A and correction information B. Thus, the controller 31 can smoothly determine the target position and so on.

The controller 31 receives the dispense command C from external apparatus. Consequently, the controller 31 can conveniently determine the target position and so on.

The target dispensed amount specified in the dispense command C is information relevant merely to a moving distance of the piston 25. Similarly, the target flow rate specified by the dispense command C is information relevant merely to a moving speed of the piston 25. The target dispensed amount and the target flow rate are therefore not information concerning the start position of the piston 25, current position of the piston 25, or target position of the piston 25. Thus, the dispense command C does not include information concerning the start position of the piston 25, current position of the piston 25, or target position of the piston 25. The dispense command C is simple. The external equipment can therefore control the pumping device 15 by the simple dispense command C.

The substrate treating apparatus 1 includes the pumping device 15. The amount of the treating liquid actually supplied to the wafer W can therefore conveniently be approximated to the target dispensed amount. That is, the amount of the treating liquid supplied to the wafer W can be adjusted with high accuracy. Thus, the quality of treatment performed on the wafer W can be improved conveniently.

Part of the pump chamber 21 is demarcated by the diaphragm 23. Consequently, the volume in the pump chamber 21 can be changed conveniently by the motor 27 moving the piston 25.

This invention is not limited to the foregoing embodiment, but may be modified as follows:

(1) Under processing conditions 1 set out hereinbefore, the correction information B includes the actual position equal to the current position and the theoretical position equal to the imaginary terminal point. This invention is not limited to this. For example, the correction information B does not need to include the actual position equal to the current position. The correction information B does not need to include the theoretical position equal to the imaginary terminal point. In this modified embodiment, the controller 31 can correct the current position to the imaginary starting point by interpolating the correction information B. Similarly, the controller 31 can correct the imaginary terminal point to the target position by interpolating the correction information B.

Figures 6, 7:
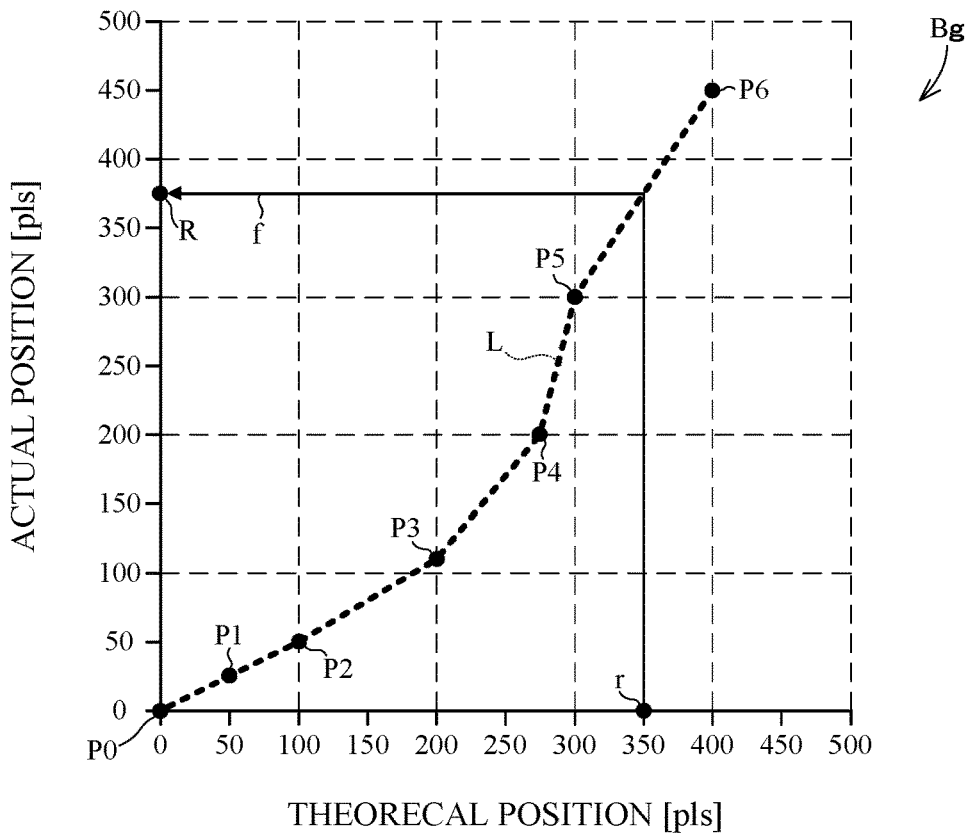
FIG. 6 is a view schematically showing a straight line for interpolating the correction information.
FIG. 7 is a view schematically showing correction information in a modified embodiment.

FIG. 6 is a view schematically showing a straight line for interpolating the correction information B. FIG. 6 shows a graph plotting the correction information B in FIG. 3. The graph shown in FIG. 6 will hereinafter be called "correction graph Bg".

FIG. 6 further shows straight line L for interpolating the correction information B in a broken line. Straight line L has points P0, P1, P2, . . . , and P6 linked by line segments. Straight line L is a set of line segments each connecting two adjoining points P. The two adjoining points P are point P0 and point P1, for example. Thus, straight line L includes a line segment connecting point P0 and point P1, for example. Straight line L is a polygonal line, for example. The controller 31 interpolates the theoretical position and actual position included in the correction information B by means of straight line L. The controller 31 estimates a theoretical position equal to the imaginary terminal point using straight line L. Further, the controller 31, using straight line L, estimates an actual position correlated with an estimated theoretical position as the target position.

Suppose, for example, that imaginary terminal point r is 350 [pls]. The correction information B does not include a theoretical position equal to imaginary terminal point r (350 [pls]). In this case, the controller 31 carries out the following process in step S4. The controller 31 determines a point on straight line L that corresponds to theoretical position 350 [pls]. Straight line L correlates theoretical position 350 [pls] with actual position 375 [pls]. Based on straight line L, the controller 31 determines that the actual position correlated with theoretical position 350 [pls] is 375 [pls]. The controller 31 treats actual position 375 [pls] as target position R. Sign fin the correction graph Bg of FIG. 6 schematically indicates a process of estimating the target position by means of straight line L.

Similarly, even if the correction information B does not include an actual position equal to the current position of the piston 25, the controller 31 can conveniently estimate an imaginary starting point corresponding to the current position by means of straight line L. Specifically, based on straight line L, the controller 31 determines a theoretical position correlated with the actual position equal to the current position. The controller 31 estimates the determined theoretical position to be an imaginary starting point.

In the above modified embodiment, the controller 31 interpolates the correction information B by means of straight line L. This invention is not limited to this. For example, the controller 31 may interpolate the correction information B by using a curve. For example, the controller 31 may estimate at least one of an imaginary terminal point and a target position by means of a curve for interpolating theoretical positions and actual positions to be included in the correction information B. For example, the controller 31 may estimate at least one of a start position, a current position and an imaginary starting point by means of a curve for interpolating theoretical positions and actual positions to be included in the correction information B. For example, the controller 31 may estimate at least one of a target position and an imaginary starting point by means of a curve for interpolating theoretical positions and actual positions to be included in the correction information B. By interpolating the correction information B by means of a curve, the accuracy of estimating the imaginary terminal point, target position and so on can be improved. On the other hand, in the mode of interpolating the correction information B by means of straight line L, the processing by the controller 31 can be lightened.

(2) Under processing conditions 1 set out hereinbefore, the number of intermediate actual positions included in the correction information B is two. This invention is not limited to this.

For example, the number of intermediate actual positions included in the correction information B may be three or more. In step S6 in this mode, the controller 31 determines four or more sections included between the current position and the target position. Specifically, the controller 31 determines one first section, one second section, and two or more intermediate sections. In step S7, the controller 31 determines four or more imaginary sections. Specifically, the controller 31 determines one imaginary first section, one imaginary second section, and two or more imaginary intermediate sections. In step S9, the controller 31 determines four or more revised speeds. Specifically, the controller 31 determines one first revised speed, one second revised speed, and two or more intermediate revised speeds.

For example, the number of intermediate actual positions included in the correction information B may be one. In step S6 in this mode, the controller 31 determines two sections. The two sections are a first section from the current position to an intermediate actual position, and a second section from the intermediate actual position to the target position. In step S7, the controller 31 determines two imaginary sections. Specifically, the correction information B includes one intermediate theoretical position which is a theoretical position correlated with the intermediate actual position. The controller 31 determines an imaginary first section from the imaginary starting point to the intermediate theoretical position. The controller 31 determines an imaginary second section from the intermediate theoretical position to the imaginary terminal point. In step S9, the controller 31 determines two revised speeds. Specifically, the controller 31 calculates a first revised speed by multiplying the theoretical speed by a value obtained from dividing the distance of the first section by the distance of the imaginary first section. The controller 31 calculates a second revised speed by multiplying the theoretical speed by a value obtained from dividing the distance of the second section by the distance of the imaginary first section. In step S10, the controller 31 outputs a drive command to the motor 27 for moving the piston 25 at the first revised speed through the first section. The controller 31 outputs a drive command to the motor 27 for moving the piston 25 at the second revised speed through the second section.

For example, the number of intermediate actual positions included in the correction information B may be zero. That is, the correction information B may include no intermediate actual position. In this case, the controller 31 omits the process for determining sections (step S6) and the process for determining imaginary sections (step S7). In step S9, the controller 31 determines one revised speed. Specifically, the controller 31 calculates the revised speed by multiplying the theoretical speed by a value obtained from dividing the distance between the current position and the target position by the distance between the imaginary starting point and the imaginary terminal point. In step S10, the controller 31 outputs a drive command to the motor 27 to move the piston 25 at the revised speed from the current position to the target position.

(3) In the theoretical information A illustrated in the foregoing embodiment, the theoretical value of dispensed amount is proportional to the moving distance of the piston 25. The theoretical speed of the piston 25 is therefore constant regardless of the position of the piston 25. However, this invention is not limited to this. In the theoretical information A, the theoretical value of dispensed amount need not be proportional to the moving distance of the piston 25. The theoretical speed of the piston 25 may vary with the position of the piston 25. In this modified embodiment, it is preferred that the controller 31 determines a theoretical speed for each imaginary section by referring to the theoretical information A.

Specifically, in step S8, the controller 31 determines a first theoretical speed for the imaginary first section, a middle theoretical speed for the imaginary middle section, and a second theoretical speed for the imaginary second section. In step S9, by referring to the correction information B, the controller 31 corrects the first theoretical speed to a first revised speed, corrects the middle theoretical speed to a middle revised speed, and corrects the second theoretical speed to a second revised speed. Specifically, the controller 31 calculates the first revised speed by multiplying the first theoretical speed by a value obtained from dividing the distance of the first section by the distance of the imaginary first section. The controller 31 calculates the middle revised speed by multiplying the middle theoretical speed by a value obtained from dividing the distance of the middle section by the distance of the imaginary middle section. The controller 31 calculates the second revised speed by multiplying the second theoretical speed by a value obtained from dividing the distance of the second section by the distance of the imaginary second section. Consequently, even if the theoretical speed of the piston 25 varies with the position of the piston 25, the controller 31 can appropriately set moving speeds of the piston 25.

(4) In the foregoing embodiment, the start position of the piston 25 is the current position of the piston 25. That is, the start position of the piston 25 is not determined beforehand. The start position of the piston 25 is not always the same position. However, this invention is not limited to this. For example, the start position of the piston 25 need not be the current position of the piston 25. For example, the start position of the piston 25 may be a position determined beforehand. For example, the start position of the piston 25 may always be the same position.

For example, the controller 31 may move the piston 25 back to a predetermined position whenever the pumping device 15 performs suction of the treating liquid. According to this mode, the start position of the piston 25 can easily be maintained in the predetermined position.

The start position may, for example, be a position equal to the first reference position in the theoretical information A. Alternatively, the start position may be a position equal to the second reference position in the correction information B.

In this modified embodiment, the start position of the piston 25 is known, making it unnecessary to determine a current position of the piston 25 based on a detection result from the encoder 29. The controller 31 may therefore omit the process in step S2 (determination of current position). Consequently, the processing by the controller 31 can be simplified. The pumping device 15 does not need to have the encoder 29. The construction of the pumping device 15 can be simplified by omitting the encoder 29.

Since the start position of the piston 25 is a position determined beforehand, the imaginary starting point is also a position determined beforehand. That is, the imaginary starting point is known. The controller 31 may therefore omit the process in step S3 (determination of imaginary starting point). Consequently, the processing by the controller 31 can be further simplified.

In this modified embodiment, the start position of the piston 25 is not necessarily a current position. It is therefore preferred to read "current position" in the description of step S6 in the embodiment as "start position". In this modified embodiment, for example, the controller 31 determines sections included between the "start position" and the target position. In this modified embodiment, for example, the controller 31 determines the section from the "start position" to the intermediate actual position to be a first section.

(5) In the foregoing embodiment, the number of correction information B is one, but the invention is not limited to this. The number of correction information B may be plural. For example, the correction information B may include first correction information, and second correction information different from the first correction information. The controller 31 may select one of the first correction information and second correction information based conditions of the treating liquid, and correct the imaginary terminal point to the target position by referring to the selected one of the first correction information and second correction information. The conditions of the treating liquid are at least one of the type of treating liquid, viscosity of the treating liquid, density of the treating liquid, and operating temperature of the treating liquid, for example. Further, it is preferred that the storage unit 32 stores the first correction information and second correction information.

(6) In the foregoing embodiment, the number of theoretical information A is one, but the invention is not limited to this. The number of theoretical information A may be plural. For example, the theoretical information A may include first theoretical information, and second theoretical information different from the first theoretical information. The controller 31 may select one of the first theoretical information and second theoretical information based conditions of the treating liquid, and determine the imaginary terminal point by referring to the selected one of the first theoretical information and second theoretical information. The conditions of the treating liquid are at least one of the type of treating liquid, viscosity of the treating liquid, density of the treating liquid, and operating temperature of the treating liquid, for example. Further, it is preferred that the storage unit 32 stores the first theoretical information and second theoretical information.

(7) In the foregoing embodiment, the theoretical information A and correction information B indicate the positions of the piston 25 with the numbers of pulses. The invention is not limited to this. For example, at least one of the theoretical information A and correction information B may indicate the position of the piston 25 with the distance from the first/second reference position.

(8) In the foregoing embodiment, the theoretical speeds and revised speeds are indicated with pulse rates [pls/sec]. The invention is not limited to this. For example, the theoretical speeds and revised speeds may be indicated with distances per unit time.

(9) In the foregoing embodiment, the theoretical information A is in the form of a graph. The invention is not limited to this. For example, the theoretical information A may be in the form of functions or a table. In the foregoing embodiment, the correction information B is in the form of a table. The invention is not limited to this. For example, the correction information B may be in the form of functions or a graph.

(10) In the foregoing embodiment, the second reference position is the same as the first reference position. The invention is not limited to this. That is, the second reference position may be different from the first reference position. FIG. 7 is a view schematically showing correction information in a modified embodiment. In the correction information B shown in FIG. 7, the second reference position is 25 [pls]. That is, the dispensed amount in the second reference position is 0 [cc]. With the correction information B shown in FIG. 7 used in place of the correction information B shown in FIG. 3, the controller 31 can determine the same target position as in the foregoing embodiment.

(11) In the foregoing embodiment, the dispense command C includes information concerning the target flow rate. The invention is not limited to this. That is, the dispense command C does not need to include information concerning the target flow rate. In this modified embodiment, the controller 31 omits the processes in steps S6 to S9, and does not determine revised speeds. In step S10, the controller 31 outputs a drive command to the motor 27 for simply moving the piston 25 from the current position to the target position. That is, the controller 31 does not output to the motor 27 a drive command concerning a moving speed of the piston 25.

(12) In the foregoing embodiment, the dispense command C includes information concerning the target dispensed amount and target flow rate. The invention is not limited to this. For example, the dispense command C may also include any two of the target dispensed amount, target flow rate, and target dispensing time. The target dispensed amount is uniquely determined by the target flow rate and target dispensing time. The target flow rate is uniquely determined by the target dispensed amount and target dispensing time. Thus, in this modified embodiment also, the target dispensed amount and target flow rate can be uniquely determined from the two information items included in the dispense command C.

(13) In the foregoing embodiment, although the amount of the treating liquid [cc] is illustrated as information concerning the target dispensed amount. The invention is not limited to this. When the dispensed amount is uniquely determined by moving distance of the piston 25, the information concerning the target dispensed amount may be provided by the moving distance of the piston 25. In the foregoing embodiment, the amount of the treating liquid per unit time [cc/sec] is illustrated as information concerning the target flow rate. The invention is not limited to this. When the flow rate is uniquely determined by moving speed of the piston 25, the information concerning the target flow rate may be provided by moving speed of the piston 25.

(14) In the foregoing embodiment, the movable partition member (specifically, diaphragm 23) demarcates part of the pump chamber 21. The invention is not limited to this. That is, the movable partition member may demarcate the entire pump chamber 21.

(15) In the foregoing embodiment, the movable partition member is the diaphragm 23. The invention is not limited to this. The movable partition member may be a tubephragm or bellows, for example.

(16) In the foregoing embodiment, the piston 25 is connected to the movable partition member (diaphragm 23). The invention is not limited to this. The piston 25 does not need to contact the movable partition member. In the foregoing embodiment, the piston 25 directly deforms the movable partition member (diaphragm 23). The invention is not limited to this. For example, the piston 25 may deform the movable partition member indirectly. For example, the piston 25 may deform the movable partition member through an indirect liquid or working fluid. For example, the piston 25 may deform the movable partition member by changing the pressure of the indirect liquid or working fluid.

(17) In the foregoing embodiment, the piston 25 is illustrated as movable member. The invention is not limited to this. The movable member may be a rod or shaft, for example.

(18) In the foregoing embodiment, the motor 27 is a stepping motor. The invention is not limited to this. The motor 27 may be a servomotor, for example. In the foregoing embodiment, the motor 27 is illustrated as actuator. The invention is not limited to this. The actuator of the pumping device 15 may be an air cylinder. The air cylinder is also called a pneumatic drive cylinder. In this modified embodiment, the controller 31 controls the air cylinder. For example, the controller 31 may control air pressure which is a drive source of the air cylinder, by controlling an electro-pneumatic regulator. This enables the controller 31 to control the air cylinder conveniently.

(19) In the foregoing embodiment, the pumping device 15 has the encoder 29 which detects the amount of rotation of the motor 27. The invention is not limited to this. For example, the pumping device 15 may have a sensor for detecting positions of the piston 25. In this modified embodiment also, the controller 31 can conveniently determine current positions of the piston 25 based on detection results of the sensor.

(20) In the foregoing embodiment, the pumping device 15 has the encoder 29. The invention is not limited to this. For example, the controller 31 may determine a current position of the piston 25 based on drive commands so far outputted to the motor 27. For example, the controller 31 may determine a current position of the piston 25 based on an integrated value of the number of pulses so far outputted to the motor 27. In this modified embodiment, the pumping device 15 does not need the encoder 29 described in the embodiment. The construction of the pumping device 15 can be simplified by omitting the encoder 29.

(21) In the foregoing embodiment, one controller 31 controls one unit consisting of the pump chamber 21, piston 25, and motor 27. The invention is not limited to this. One controller 31 may control a plurality of units.

(22) The foregoing embodiment and each of the modified embodiments described in paragraphs (1) to (21) above may be further varied as appropriate by replacing or combining their constructions with the constructions of the other modified embodiments.

This invention may be embodied in other specific forms without departing from the spirit or essential attributes thereof and, accordingly, reference should be made to the appended claims, rather than to the foregoing specification, as indicating the scope of the invention.

What is claimed is:

1. A pumping apparatus for dispensing a liquid, comprising:
   a pump chamber for storing the liquid, the pump chamber being configured to dispense the liquid in the pump chamber outside the pump chamber by reduction of a volume in the pump chamber;
   a movable member which is movable to change the volume in the pump chamber;
   an actuator connected to the movable member for moving the movable member; and
   a controller for controlling the actuator;
   wherein the controller is configured to:
      determine an imaginary terminal point by referring to a dispense command including information concerning a target dispensed amount which is a target value of dispensed amount of the liquid dispensed from the pump chamber, theoretical information concerning a theoretical relationship between a position of the movable member and the dispensed amount, and a start position of the movable member;
      correct the imaginary terminal point to a target position by referring to correction information concerning a difference between a theoretical relationship of the position of the movable member and the dispensed amount, and an actual relationship of the position of the movable member and the dispensed amount; and
      output a drive command to the actuator for moving the movable member from the start position to the target position.

2. The pumping apparatus according to claim 1, wherein:
   the theoretical information correlates a theoretical value of the dispensed amount at a time when the movable member reaches from a first reference position to a first position, and the first position;
   the correction information correlates a theoretical position and an actual position; and
   the theoretical value of the dispensed amount at a time when the movable member reaches from a second reference position to the theoretical position is equal to an actual value of the dispensed amount at a time when the movable member reaches from the second reference position to the actual position correlated with the theoretical position.

3. The pumping apparatus according to claim 2, wherein:
the start position is a current position of the movable member; and
the controller is configured to:
   correct the current position of the movable member to an imaginary starting point by referring to the correction information; and
   determine the imaginary terminal point by referring to the dispense command, the theoretical information, and the imaginary starting point.

4. The pumping apparatus according to claim 3, wherein the controller is configured to:
determine, as the imaginary starting point, the theoretical position correlated with the actual position equal to the current position of the movable member in the correction information;
determine, as an initial dispensed amount, the theoretical value of the dispensed amount correlated with the first position equal to the imaginary starting point in the theoretical information;
determine a total amount which is a sum of the initial dispensed amount and the target dispensed amount;
determine, as the imaginary terminal point, the first position correlated with the theoretical value of the dispensed amount equal to the total amount in the theoretical information; and
determine, as the target position, the actual position correlated with the theoretical position equal to the imaginary terminal point in the correction information.

5. The pumping apparatus according to claim 3, comprising a sensor for detecting at least one of a drive amount of the actuator and the position of the movable member;
wherein the controller is configured to determine the current position of the movable member based on a detection result of the sensor.

6. The pumping apparatus according to claim 2, wherein the controller is configured to estimate at least one of the imaginary terminal point and the target position based on a straight line or curve for interpolating the theoretical position and the actual position included in the correction information.

7. The pumping apparatus according to claim 2, wherein:
the dispense command includes information concerning a target flow rate which is a target value of flow rate of the liquid dispensed from the pump chamber; and
the controller is configured to:
   determine, as a theoretical speed, a theoretical moving speed of the movable member for dispensing the liquid at the target flow rate from the pump chamber, by referring to the theoretical information;
   correct the theoretical speed to a revised speed by referring to the correction information; and
   output a drive command to the actuator for moving the movable member at the revised speed.

8. The pumping apparatus according to claim 7, wherein the controller is configured to:
determine a plurality of sections included between the start position and the target position by referring to the correction information;
correct the theoretical speed to the revised speed for each of the sections by referring to the correction information; and
output a drive command for moving the movable member through each of the sections at the revised speed for each of the sections.

9. The pumping apparatus according to claim 8, wherein:
the correction information includes one intermediate actual position which is an actual position located between the start position and the target position; and
the sections include:
   a first section from the start position to the intermediate actual position; and
   a second section from the intermediate actual position to the target position.

10. The pumping apparatus according to claim 9, wherein:
the correction information includes one intermediate theoretical position which is a theoretical position correlated with the intermediate actual position; and
the controller is configured to:
   correct the current position of the movable member to the imaginary starting point by referring to the correction information;
   determine an imaginary first section from the imaginary starting point to the intermediate theoretical position;
   determine an imaginary second section from the intermediate theoretical position to the imaginary terminal point;
   calculate a first revised speed by multiplying the theoretical speed by a value obtained from dividing a distance of the first section by a distance of the imaginary first section;
   calculate a second revised speed by multiplying the theoretical speed by a value obtained from dividing a distance of the second section by a distance of the imaginary second section;
   output a drive command to the actuator for moving the movable member at the first revised speed through the first section; and
   output a drive command to the actuator for moving the movable member at the second revised speed through the second section.

11. The pumping apparatus according to claim 8, wherein:
the correction information includes a plurality of intermediate actual positions which are actual positions located between the start position and the target position; and
the sections include:
   a first section from the start position to one of the intermediate actual positions nearest to the start position;
   a middle section between two adjacent ones of the intermediate actual positions; and
   a second section from one of the intermediate actual positions nearest to the target position to the target position.

12. The pumping apparatus according to claim 11, wherein:
the correction information includes a plurality of intermediate theoretical positions which are theoretical positions correlated with the intermediate actual positions, respectively; and
the controller is configured to:
   correct the current position of the movable member to the imaginary starting point by referring to the correction information;
   determine an imaginary first section from the imaginary starting point to one of the intermediate theoretical positions nearest to the imaginary starting point;

determine an imaginary middle section between two adjacent ones of the intermediate theoretical positions;

determine an imaginary second section from one of the intermediate theoretical positions nearest to the imaginary terminal point to the imaginary terminal point;

calculate a first revised speed by multiplying the theoretical speed by a value obtained from dividing a distance of the first section by a distance of the imaginary first section;

calculate a middle revised speed by multiplying the theoretical speed by a value obtained from dividing a distance of the middle section by a distance of the imaginary middle section;

calculate a second revised speed by multiplying the theoretical speed by a value obtained from dividing a distance of the second section by a distance of the imaginary second section;

output a drive command to the actuator for moving the movable member at the first revised speed through the first section;

output a drive command to the actuator for moving the movable member at the middle revised speed through the middle section; and output a drive command to the actuator for moving the movable member at the second revised speed through the second section.

13. The pumping apparatus according to claim 1, wherein the controller includes a storage unit for storing the theoretical information and the correction information.

14. The pumping apparatus according to claim 1, wherein:
the controller is configured to receive the dispense command from external equipment; and
the dispense command does not include information concerning the start position of the movable member, the current position of the movable member, and the target position of the movable member.

15. A substrate treating apparatus for treating a substrate, comprising:
a holder for holding the substrate;
a nozzle for supplying a treating liquid to the substrate held by the holder; and
a pumping device connected to the nozzle;
wherein the pumping device includes:
a pump chamber for storing the treating liquid, the pump chamber being configured to dispense the treating liquid in the pump chamber to the nozzle by reduction of a volume in the pump chamber;
a movable member which is movable to change the volume in the pump chamber;
an actuator connected to the movable member for moving the movable member; and
a controller for controlling the actuator; and
the controller is configured to:
determine an imaginary terminal point by referring to a dispense command including information concerning a target dispensed amount which is a target value of dispensed amount of the treating liquid dispensed from the pump chamber, theoretical information concerning a theoretical relationship between a position of the movable member and the dispensed amount, and a start position of the movable member;
correct the imaginary terminal point to a target position by referring to correction information concerning a difference between a theoretical relationship of the position of the movable member and the dispensed amount, and an actual relationship of the position of the movable member and the dispensed amount; and
output a drive command to the actuator for moving the movable member from the start position to the target position.

* * * * *